United States Patent [19]

Sankrithi

[11] Patent Number: 4,511,170

[45] Date of Patent: Apr. 16, 1985

[54] AERODYNAMIC DEVICE FOR LAND VEHICLES

[76] Inventor: Mithra M. K. V. Sankrithi, 417 Bellevue Way SE., #400, Bellevue, Wash. 98004

[21] Appl. No.: 401,335

[22] Filed: Jul. 23, 1982

[51] Int. Cl.³ .................... B62D 35/00; B64C 1/26
[52] U.S. Cl. .................... 296/1 S; 244/12.1
[58] Field of Search .................... 296/91, 1 S; 244/91, 244/199, 12.1; 180/116, 123, 126, 903

[56] References Cited

U.S. PATENT DOCUMENTS

| | | | |
|---|---|---|---|
| 2,665,137 | 1/1954 | Kamm | 296/1 S |
| 2,797,951 | 7/1957 | McLean | 296/1 S |
| 2,976,077 | 3/1961 | Totton, Jr. | 296/1 S |
| 3,309,131 | 3/1967 | Saunders | 296/91 |
| 3,718,345 | 2/1973 | Bringman | 296/1 S |
| 3,768,582 | 10/1973 | Phillippe | 296/1 S |
| 3,815,696 | 6/1974 | Larive et al. | 296/1 S |
| 3,869,617 | 3/1975 | Gaussoin et al. | 296/1 S |
| 3,971,452 | 7/1976 | Morelli | 296/1 S |
| 4,043,587 | 8/1977 | Giallourakis et al. | 296/91 |
| 4,272,043 | 6/1981 | Spillman | 244/91 |
| 4,284,302 | 8/1981 | Drews | 296/1 S |

FOREIGN PATENT DOCUMENTS

| | | | |
|---|---|---|---|
| 978236 | 11/1975 | Canada | 296/91 |
| 96563 | 8/1939 | Sweden | 180/903 |

*Primary Examiner*—Robert B. Reeves
*Assistant Examiner*—Dennis H. Pedder

[57] ABSTRACT

This invention relates to aerodynamic devices for wheel supported land vehicles such as automobiles. The basic invention as illustrated in FIG. 1 shows an aerodynamic device comprising a plurality of winglets (1) projecting from lower/side body surface regions of a wheel supported land vehicle (2). The principal use of this invention is to produce an aerodynamic downforce on said land vehicle. In general winglets installed at negative angles of incidence will produce such a downforce. A downforce may be produced by downforce components on the winglets themselves and also as a result of pressure distributions induced by the winglets on body surface regions of said land vehicle. This aerodynamic device may also be used for drag reduction or control purposes.

10 Claims, 7 Drawing Figures

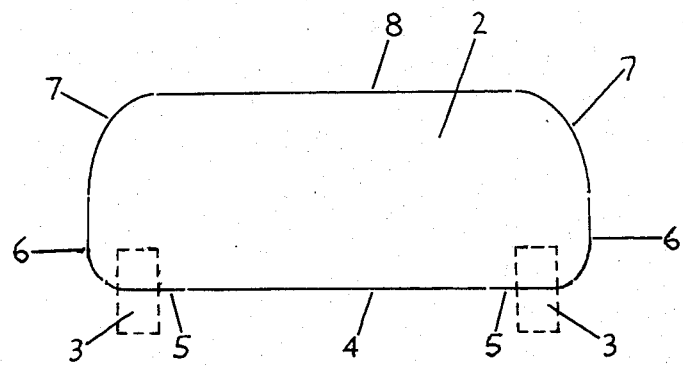
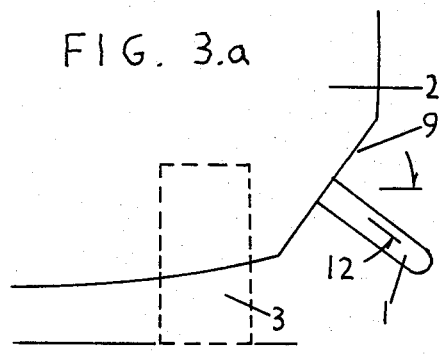
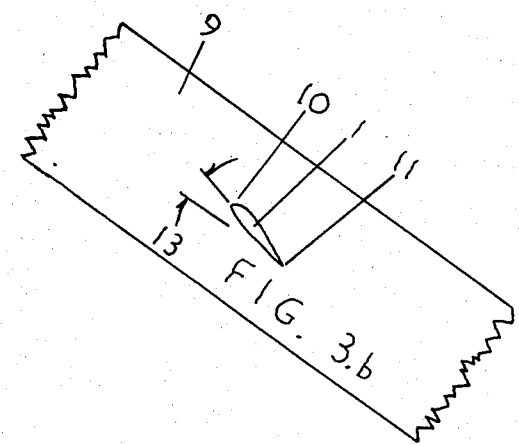

AERODYNAMIC DEVICE FOR LAND VEHICLES

FIELD OF INVENTION

This invention relates to aerodynamic devices for wheel supported land vehicles, which aerodynamic devices produce some desirable force or forces on said land vehicles. One species of such devices produce a downforce on land vehicles through aerodynamic means.

DISCUSSION OF PRIOR ART

A variety of aerodynamic devices exist in the prior art for land vehicles, such as spoilers and wings for automobiles. Spoilers and wings are typically mounted on the rear upperbodies of road automobiles, and are usually designed to produce a downward aerodynamic force on the vehicle so as to improve traction, road-holding, and handling. Air dam spoilers mounted just below the front grilles of automobiles perform a similar function. A variety of wing-like devices have been used on racing cars, also to produce an aerodynamic downforce. Internal venturi flow channels with top and side plates are used in the so-called "ground-effect" racing cars. The existing devices mentioned above suffer from a variety of disadvantages. Rear upperbody mounted devices have the disadvantage that they may interfere with rearward vision. Front air dam spoilers often produce significant increases in pressure drag, as flow separates from their bottom edges. Many externally mounted spoilers and wings can not produce large downforces because of their small planform areas. The "ground-effect" venturi devices on racing cars produce larger downforces, but have the disadvantages of difficulty of adaptation to passenger cars and the need for very small gaps between the side plates and the ground surface.

Some other aerodynamic devices for drag reduction for land vehicles also exist in the prior art, such as cab top mounted fairings for tractor-trailer trucks and smooth bottom plates for automobiles.

OBJECTS OF THE INVENTION

Several objects of my invention are as follows:

It is an object of my invention to provide an aerodynamic device for land vehicles which can produce a downforce contribution to said land vehicles.

It is an object of my invention to provide an aerodynamic device for land vehicles which can produce a downforce contribution to said land vehicles, so as to improve the traction, roadholding, and handling of said land vehicles.

It is an object of my invention to provide an aerodynamic device for land vehicles which can produce a downforce contribution to said land vehicles, without producing unreasonably large amounts of accompanying separation drag.

It is an object of my invention to provide aerodynamic devices for land vehicles which can produce desirable distributions not only on the surfaces of said aerodynamic devices but also on the adjoining surfaces of said land vehicles.

It is an object of my invention to provide aerodynamic devices for land vehicles that can reduce induced drag on said land vehicles by reducing the upward aerodynamic lift acting on said land vehicles.

It is an object of my invention to provide aerodynamic devices for land vehicles that may reduce pressure drag by acting as flow guide vanes.

It is an object of my invention to provide an aerodynamic device for land vehicles that will be compatible with non-racing cars.

It is an object of my invention to provide an aerodynamic device for land vehicles which will not interfere with the vision of the operators of said land vehicles.

It is an object of my invention to provide an aerodynamic device for land vehicles which may be adapted to provide aerodynamic control forces on said land vehicles.

Further objects and advantages of my invention will become apparent from a consideration of the drawings and ensuing description thereof.

BRIEF DESCRIPTION OF THE DRAWINGS

FIG. 2 shows a diagrammatic front view of a typical cross-section of a wheel supported land vehicle, for the purpose of defining some terms.

FIG. 3 shows diagrammatic views of a wheel supported land vehicle equipped with a winglet, for the purpose of defining some terms. Here FIG. 3.a shows a front view, and FIG. 3.b shows a view of the surface panel on which the winglet is mounted, viewed perpendicularly to said panel from below and to the left.

FIG. 4 shows similar diagrammatic views of a wheel supported land vehicle with a winglet having negative angle of incidence and convex side downward.

DETAILED DESCRIPTION

Figure 1:
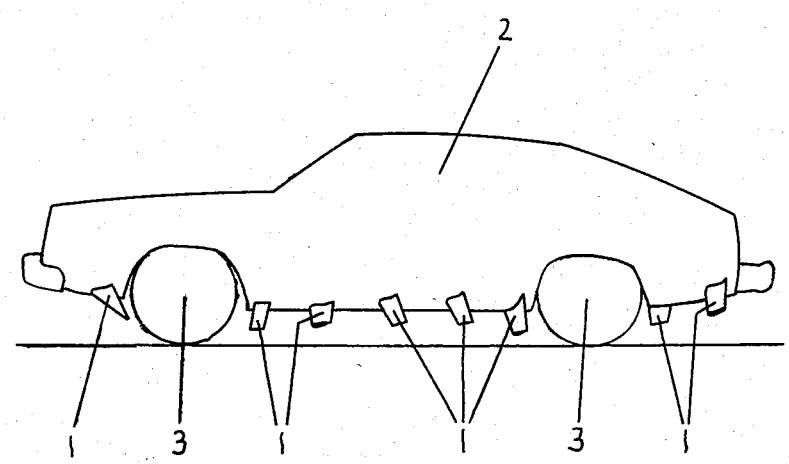
FIG. 1 shows a left side view of a wheel supported land vehicle equipped with the aerodynamic device invention.

FIG. 1 shows the basic invention, an aerodynamic device comprising of a plurality of winglets 1 projecting from the bottom sides of a wheel supported land vehicle. The wheel supported land vehicle is designated 2 in FIG. 1, and the wheels themselves are designated 3. The wheel supported land vehicle 2 shown in FIG. 1 resembles an automobile, but the generic invention can be applied to many different nonarticulated and articulated wheel supported land vehicles, including automobiles, vans, buses, trucks, the trailers of tractor-trailer trucks, and railcars. Note that for the embodiment of the invention illustrated in FIG. 1, a majority of the winglets are located forward of the rearmost wheels and aft of the frontmost wheels of the wheel supported land vehicle.

FIG. 2 shows a stylized front view of a cross-section of a wheel supported land vehicle, for the purpose of defining some terms. Now again the wheels 3 support the wheel supported land vehicle 2. We now define the surface regions around the periphery of the cross-section, as follows. The bottom surface comprises the inner portion of the lower body surface 4 and
the outer portions of the lower body surface 5. The side surfaces comprise
the lower portions of the side body surfaces 6 and
the upper portions of the side body surfaces 7.

Finally, the top surface is designated 8. Reasonable extrapolations may be made to define the various surfaces for vehicle configurations different from the one shown in FIG. 2.

FIG. 3 shows a winglet 1 projecting from a surface panel 9. The winglet leading edge 10 and winglet trailing edge 11 are also shown. This stylized Figure has been drawn primarily to illustrate the anhedral angle 12 and the angle of incidence 13. The anhedral is an angle measured on a vehicle cross-sectional plane, between the horizontal and the spanwise direction of the winglet. The anhedral angle is positive when the winglet tip is at a lower level than the winglet root. The angle of incidence is defined on a plane perpendicular to said spanwise direction of the winglet. The angle of incidence is the angle between the horizontal and the winglet mean chord, as projected on the plane defined in the previous sentence. The angle of incidence is positive when the winglet is inclined so as to direct air towards the region under the vehicle, when the vehicle has a positive forward airspeed. Note that the convex side is upward, and that the anhedral and the angle of incidence are positive as shown in FIG. 3. For a complex winglet with sweep, taper, twist, and different planform from that of FIG. 3, reasonable extensions of the above definitions of anhedral and incidence may be used, "averaged" over the winglet. Note that for the embodiment of the invention illustrated in FIG. 1, a majority of the winglets have negative angles of incidence and positive anhedral angles, and so serve in conjunction to induce outward flow from the region under the vehicle body, and to ultimately reduce the pressures under the vehicle body.

While on the subject of defining terms, it is worthwhile to here also define the meanings which some further special words and expressions are to be understood to convey, in the descriptive portion of this specification and in the appended claims.

The word "winglet", which we have already used, is to be understood to refer to an airfoil or small wing attached to a vehicle for the purpose of producing some desirable force or forces, at desirable times, on said vehicle, through aerodynamic means. The "desirable force" produced by winglets on airplane wingtips (a device known in the prior art) is typically a reduction in induced drag, with an accompanying reduction in the intensity of wingtip trailing vortices. A more important "desirable force" produced by winglets on land vehicles, as disclosed here, may be the production of a downward aerodynamic force component on said land vehicles. It should be noted that our land vehicle winglets are not to be presumed to be limited to the sizes, shapes, locations, orientations, or functions of typical airplane winglets.

The term "plurality" is to be understood to refer to a number greater than two.

The term "outward" is to be understood to apply to a direction defined by a unit vector perpendicular to the vehicle's plane of symmetry (if such a plane of symmetry exists), and pointing away from said plane.

Having defined some terms, let us now describe some characteristics to be found in the preferred mode of carrying out this invention. In the preferred mode a plurality of winglets will project from body surface regions on either side of a wheel supported land vehicle such as an automobile; wherein said body regions are located between the outer portions of the lower body surface of said wheel supported land vehicle and the lower portions of the side body surfaces of said wheel supported land vehicle, inclusive. The wheel supported land vehicle will preferably have a plane of symmetry, a body substantially symmetric with respect to said plane of symmetry, and an even number of supporting wheels which are also located substantially symmetrically with respect to said plane of symmetry. Preferably the winglets will be arranged approximately in tandem in rows on either side of the vehicle. Preferably the winglets will be oriented so as to have anhedral angles between 0° and 100° and angles of incidence of between −30° and +15°. Preferably a majority of the winglets will be of aspect ratio between 0.5 and 5, as shown in FIG. 1. Preferably the winglets will be cambered with their convex side downward/inward.

In the preferred mode of carrying out the invention, the winglets will make the flow under the vehicle have a less positive or more negative pressure gradient than would be the case for the vehicle without winglets. A negative pressure gradient is defined for pressure increasing in the primary flow direction (i.e., backwards), as for example in a diffuser. Preferably, the winglets will in conjunction direct air outwards from the sides of the underbody flow region, and thus by application of the continuity equation produce a less positive or more negative pressure gradient (i.e., a negative increment to the pressure gradient) under the vehicle. The winglets will preferably be carefully designed to prevent/minimize separation in the underbody flow with the less positive or more negative pressure gradient. As the pressure at the trailing edge of the underbody region is ideally fixed by an external flow matching condition (e.g., the Kutta condition), the change in underbody flow pressure gradient induced by the plurality of winglets will also reduce the actual pressures acting on the underbody of the vehicle, and thus reduce the lift or increase the downforce acting on the vehicle. Preferably the winglets will be so shaped (e.g., cambered with their convex sides downward/inward), oriented (e.g., with negative angle of incidence and positive anhedral), and positioned (e.g., in tandem on body surface regions on either side of the vehicle, with appropriate longitudinal spacing between subsequent winglets to optimize their mutual interaction), as to act as means for the aerodynamic pressure distributions on said winglets, and the differential aerodynamic pressure distribution induced by said winglets on the entire nonwinglet external surface of the vehicle (e.g., especially the vehicle underbody), to yield in combination a net downward force component on the vehicle, when the vehicle has a positive forward airspeed. Commonly, road vehicles have positive lift. By applying the present invention this lift can be reduced or eliminated, thus improving traction and roadhandling. By reducing lift, this invention will also reduce the lift induced drag, and therefore the net drag, acting on the vehicle.

Figure 4A:
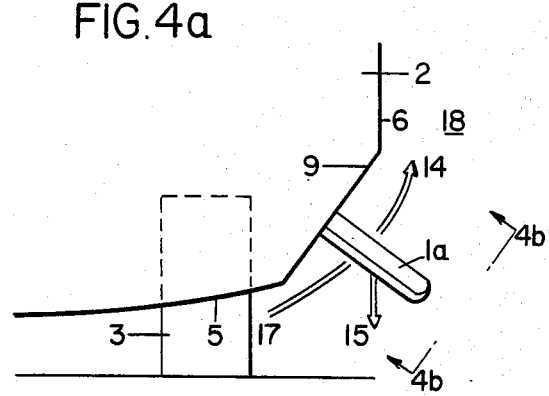
FIG. 4a shows a front view.
Figure 4B:
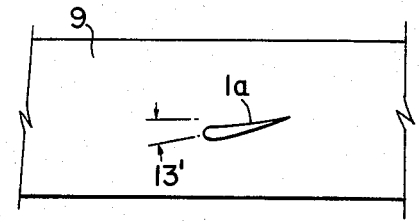
FIG. 4b shows a view of the surface panel on which the winglet is mounted, viewed perpendicularly to said panel from below.

An example of a winglet 1 with negative angle of incidence 13' and its convex side downward and inward, is illustrated in FIG. 4. Such a winglet will induce a flow 14 with an outward velocity component, from the region 17 under the outer portion of the lower body surface 5, to the region 18 outboard of the lower portion of the side body surface 6, as illustrated. Such a winglet 1 will also generate a downward aerodynamic force 15 on itself.

While several specific features of a preferred embodiment are recited above, several other species of the generic invention as defined in the claims, are also possible.

The winglets may be made of a variety of materials, as for example rubber, plastics, metal, wood, or composites. Rubber-like resilient and abradable materials may be preferable at the tips of winglets which may occasionally hit the ground surface. Infaltable 'pneumatic' winglets are also possible. Winglets may also be demountably attached to the wheel supported land vehicle.

Figure 5:
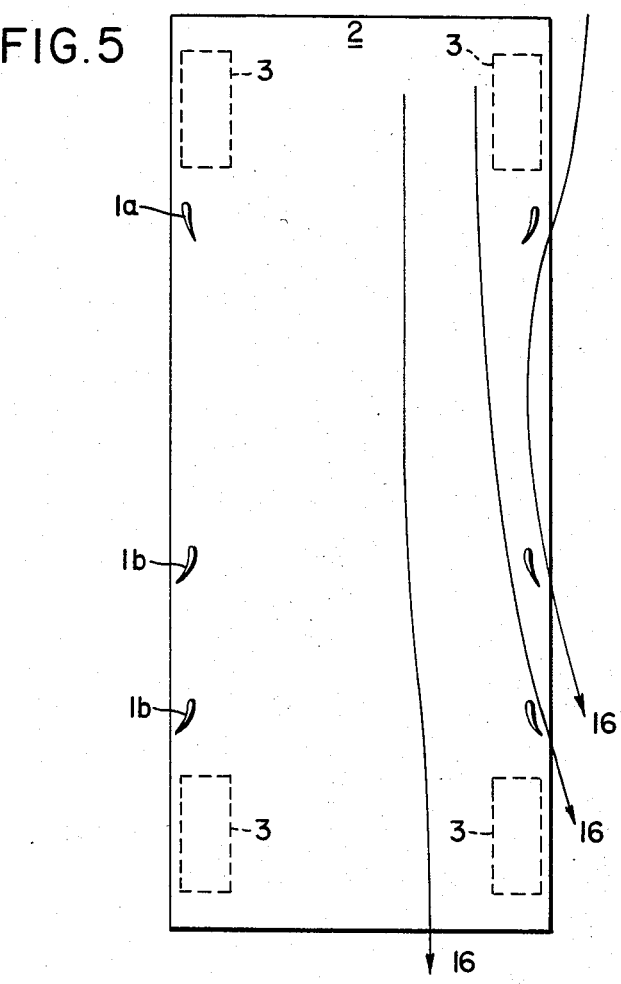
FIG. 5 shows a diagrammatic bottom view of a wheel supported land vehicle with both inward and outward flow directing winglets.

It may be desirable to install a winglet at positive angle of attack/incidence, to act as a flow directing vane, just behind an obstruction to the flow under the vehicle such as a wheel. For example, an inward flow directing winglet may be mounted under the side edges of the trailer just behind the rear chassis, drivetrain members, and wheels of the tractor in a tractor-trailer truck. Such a device may also be used primarily to reduce drag rather than to produce a downforce. Drag can be reduced by the winglet directing air into the low pressure region behind the obstruction to the flow. Even when such inward flow directing winglets are mounted towards the front of the vehicle (e.g. to reduce drag behind an obstruction to the flow), in conjunction with outward flow directing winglets towards the rear of the vehicle, the net effect will generally still be the production of a downward aerodynamic force contribution on the vehicle, through the application of the continuity equation forward from the trailing edge of the underbody flow region. An embodiment of the invention with inward flow directing winglets 1a in the front and outward flow directing winglets 1b in the back, is illustrated in FIG. 5. Some typical streamlines 16 are also illustrated here.

The winglets for wheel supported land vehicles disclosed in this invention may also be controllable. It may be useful to have winglets with adjustable/controllable angles of incidence. Adjustable/controllable trailing-edge flap-like devices may also be provided on the winglets. Driver control is possible as also automatic control of the winglets. Automatic control of the winglets may be used to improve vehicle performance in terms of roadholding, drag, stability, handling, ride quality, and response to ground or gust inputs of a random nature. A microprocessor or minicomputer may be used as a winglet controller.

While the preferred mode of carrying out the invention and some particular variations within the generic invention have been described in detail above, it will be understood that further modifications and variations may be made within the spirit and scope of the invention as defined in the appended claims.

What is claimed is:

1. In a wheel supported land vehicle having an even number of supporting wheels located substantially symmetrically on either side of said wheel supported land vehicle's plane of symmetry, the improvement comprising:

an aerodynamic device which comprises more than two winglets arranged substantially in tandem on each side of said wheel supported land vehicle;

wherein said winglets project from body surface regions on either side of said wheel supported land vehicle, which body surface regions are located inclusively between the outer portions of the lower body surface of said wheel supported land vehicle and the lower portions of the side body surfaces of said wheel supported land vehicle;

and wherein a majority of said winglets have negative angles of incidence and positive anhedral angles.

2. A wheel supported land vehicle in accordance with claim 1, with means for the majority of said winglets to in conjunction induce flow with a positive outward velocity component, from the regions under said outer portions of the lower body surface to the regions outboard of said lower portions of the side body surfaces, when said wheel supported land vehicle has a positive forward airspeed.

3. A wheel supported land vehicle in accordance with claim 1, with means for the majority of said winglets to be so shaped and positioned as to generate downward aerodynamic force components on themselves, when said wheel supported land vehicle has a positive forward airspeed.

4. A wheel supported land vehicle in accordance with claim 1, with means for said winglets to cooperatively produce aerodynamic pressure distributions on said winglets, and a differential aerodynamic pressure distribution induced by said winglets on the entire non-winglet external surface of said wheel supported land vehicle, which in combination yield a net downward force component on said wheel supported land vehicle, when said wheel supported land vehicle has a positive forward airspeed.

5. A wheel supported land vehicle in accordance with claim 1, with means for said winglets to cooperatively produce aerodynamic pressure distributions on said winglets, and a differential aerodynamic pressure distribution induced by said winglets on the entire non-winglet external surface of said wheel supported land vehicle, which in combination yield a net reduction in the drag of said wheel supported land vehicle, when said wheel supported land vehicle has a positive forward airspeed.

6. A wheel supported land vehicle in accordance with claim 1, with means for said winglets to act in conjunction to produce a negative increment to the pressure gradient under the lower body surface of said wheel supported land vehicle, when said wheel supported land vehicle has a positive forward airspeed.

7. A wheel supported land vehicle in accordance with claim 1, with means for said winglets to act in conjunction to reduce the pressures acting on the lower body surface of said wheel supported land vehicle, when said wheel supported land vehicle has a positive forward airspeed.

8. A wheel supported land vehicle in accordance with claim 1, wherein a majority of said winglets are located forward of the rearmost wheels and aft of the frontmost wheels of said wheel supported land vehicle.

9. A wheel supported land vehicle in accordance with claim 1, wherein a majority of said winglets are of aspect ratio between 0.5 and 5.

10. A wheel supported land vehicle in accordance with claim 1, wherein said wheel supported land vehicle is an automobile.

* * * * *